United States Patent Office 3,134,758
Patented May 26, 1964

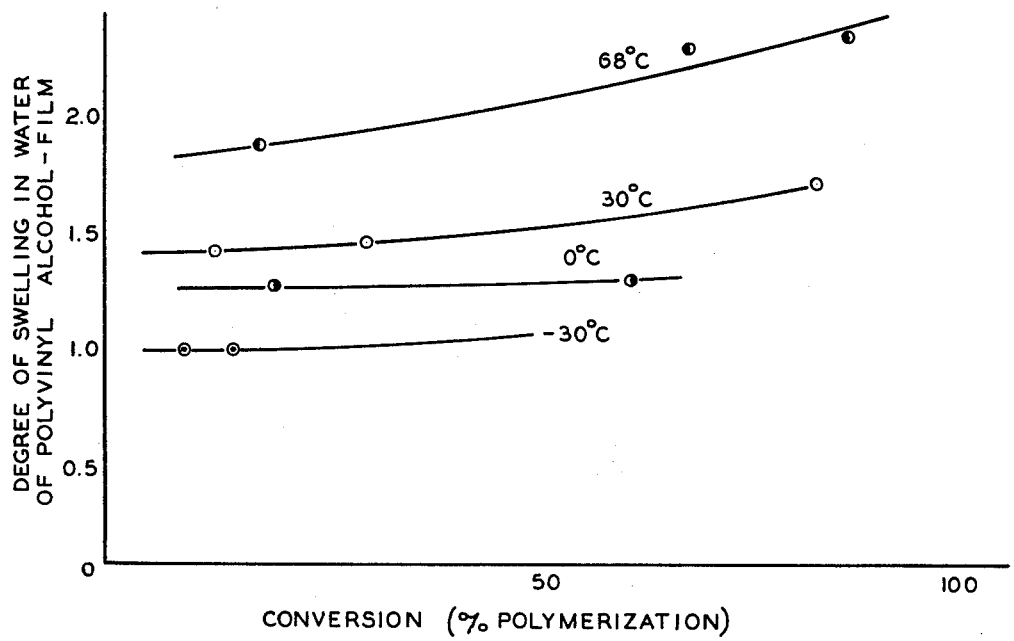

3,134,758
VINYL ESTERS AND DERIVATIVES THEREOF
AND PROCESS OF PREPARING SAME
Saburo Imoto, Kiyoshi Fujii, Junji Ukida, and Masakazu
Matsumoto, Kurashiki, Japan, assignors to Kurashiki
Rayon Co., Ltd., Okayama Prefecture, Japan, a corporation of Japan
Filed July 15, 1960, Ser. No. 43,178
Claims priority, application Japan July 16, 1959
11 Claims. (Cl. 260—89.1)

This invention relates to crystalline polyvinyl formate and polyvinyl alcohol having a small content of 1,2 glycol bonds, and to methods for their preparation, and the invention is more particularly concerned with polyvinyl alcohol of the character indicated which yields fibers, films and like shaped forms which exhibit desirable properties, including high crystallinity and water-resistance.

It is known that polyvinyl alcohol made from the polymers of vinyl acetate polymerized at lower temperatures is better, with respect to the degree of swelling in water, than polyvinyl alcohol derived from polymers of vinyl acetate which has been polymerized at higher temperatures because of a lower content of 1,2 glycol bonds. In other words, the degree of swelling in water of a film made from polyvinyl alcohol, which is obtained by saponifying the polymer resulting from the polymerization of vinyl acetate, will vary in relation to the conditions of polymerization of the vinyl acetate polymer from which the polyvinyl alcohol is formed. However, when the films are heat-treated, the degree of swelling in water of the films will gradually decrease until a value of the order of 0.2 is reached. Consequently, there is no appreciable difference among such films with respect to their degree of swelling in water.

Processes are also known for the polymerization of vinyl esters having a strong polarity in their ester chains or having large replaceable groups, to produce polymers which, upon subsequent saponification, yield polyvinyl alcohol having crystalline properties. Such processes have, for example, been applied to the polymerization of trifluorovinyl acetate, monochlorovinyl acetate, trichlorovinyl acetate, and the like. It is difficult, however, to carry out these processes of polymerizing such vinyl esters on an industrial scale, because of the various practical problems inherent in the synthesis of the monomers and the extremely low degree of polymerization of the polyvinyl alcohol obtainable from the polymers produced from these monomers. Such monomers are also, of course, relatively expensive.

It is an object of the present invention to provide polymers which will yield, upon saponification, polyvinyl alcohol from which may be produced films, fibers and the like of high crystallinity, a low degree of swelling in water, and other desirable properties.

It is another object of the invention to provide polyvinyl alcohol from which can be formed films, fibers and other shaped objects having high hot water-resistance and desirable mechanical properties.

It is a still further object of the invention to provide processes for the preparation of polymers from which may be produced polyvinyl alcohol of the character described.

In accordance with the present invention, polyvinyl alcohol having a high crystallinity and a very small content of 1,2 glycol bonds is obtained by conventional saponification of polyvinyl formate which is produced by the polymerization of vinyl formate at low temperatures, i.e. at 30° C. and below, preferentially below 0° C.

In preferred forms of the low-temperature process of the invention, polymerization of vinyl formate is effected in the presence of a lower alkyl formate or in the presence of a small proportion of vinyl acetate.

It is a feature of the invention that polymerization of vinyl formate can be effected smoothly and efficiently to produce a polymer from which polyvinyl alcohol of highly desirable properties can be directly produced.

Other objects and features of the invention will be readily apparent from the following detailed description of illustrative embodiments thereof.

Generally speaking, polyvinyl alcohol obtained from polymers of vinyl formate produced at low temperatures in accordance with the present invention, yields films which, after heat treatment, have a degree of swelling in hot water which exhibits a much greater difference, as compared with the films of polyvinyl alcohols prepared by conventional methods, than do the corresponding non-heat-treated films when tested for swelling in water at 30° C. This tendency can also be observed in the case of acetalized polyvinyl alcohol if its degree of acetalization is relatively low. It has been found in practice that films and like molded forms produced from acetalized polyvinyl alcohol may exhibit outstanding hot water-resistance as compared with polyvinyl alcohols of other known types.

Since, however, vinyl formate contains only small side chain groups and contains no highly-polar or large replaceable groups, it would not be expected that a polyvinyl alcohol having a high crystallinity could be produced from polyvinyl formate. We have found, however, contrary to expectation, that highly crystalline polyvinyl alcohol forms can be derived from polyvinyl formate produced in accordance with this invention. This is probably due to the fact that the polymerization of vinyl formate progresses in a manner such that a close, solid and uniform association of vinyl formate molecules is effectively maintained because of the intense reciprocal action between the formyl groups of the vinyl formate and the small size of formyl groups.

Because of the intense reciprocal action between the formyl groups of vinyl formate, polyvinyl formate behaves very differently from polyvinyl acetate. Whereas the X-ray diffraction pattern of polyvinyl acetate is not greatly affected by polymerization conditions, that of polyvinyl formate is substantially influenced by the conditions of polymerization. In other words, the polymer of vinyl formate obtainable at a low polymerization temperature of 0° C. and below is a crystalline polymer having a clear ring in its X-ray diffraction pattern. Polyvinyl formate produced at a temperature range from 0° C. to 30° C. does not give such clear ring in its X-ray diffraction pattern, but gives a clear fibre diagram on stretching to prove its crystallinity. Polyvinyl formate produced at higher temperatures, however, does not provide such an X-ray diffraction pattern, and the tenacity of polyvinyl alcohol fibers derived from it is greatly inferior to that of polyvinyl alcohol derived from polyvinyl formate produced in accordance with the invention.

The quantity of 1,2 glycol bonds in polyvinyl alcohol produced from polymerized vinyl acetate decreases as the temperature of polymerization of vinyl acetate is lowered. Namely, the quantity of 1,2 glycol bonds in polyvinyl alcohol derived from polyvinyl acetate polymerized at 60° C. is 1.87 mol percent, at 30° C., 1.33 mol percent, at 0° C., 1.01 mol percent, at —40° C., 0.62 mol percent and at —78° C., 0.42 mol percent.

The quantity of 1,2 glycol bonds in polyvinyl alcohol derived from the polymerized vinyl formate of this invention similarly decreases with lower temperatures of polymerization. The percentage decrease, however, is more pronounced. In other words, the quantity of 1,2 glycol bonds in the case of polyvinyl formate polymerized at 60° C. is 1.29 mol percent, at 30° C., 0.89 mol percent, at 0° C., 0.57 mol percent, at —40° C., 0.24 mol percent. A polyvinyl alcohol having a quantity of 1,2 glycol bonds of 0.24 mol percent has been very rare up to the present time. As previously mentioned, polyvinyl alcohol obtained from polyvinyl formate polymerized at a low temperature in accordance with this invention, has a very small quantity of 1,2 glycol bonds. It could not be expected from knowledge relating to the polymerization of vinyl acetate that a decrease in the temperature of polymerization would cause, in the case of polyvinyl formate, the very substantial reduction in the amount of 1,2 glycol bonds which we achieve.

The degree of swelling in pure water at 30° C. of a film prepared at 30° C. from a solution of polyvinyl alcohol, obtained by saponifying a polymer resulting from the polymerization of vinyl acetate, becomes less as the temperature of polymerization decreases. The value of the degree of swelling will vary with the conversion and other polymerizing conditions. By way of an example, the relation between the degree of swelling and the temperature of polymerization for bulk polymerization is as follows. When polymerization is effected at 60° C., the degree of swelling is 2.6 to 3.1, at 30° C., it is 2.06, at 0° C., it is 1.75, and at —78° C., it is 1.50. In particular, when polymerization is effected at 0° C. and below, the effect of the temperature of polymerization decreases.

In contrast to the above, the relationship between the degree of swelling and the temperature of polymerization in the case of a film of polyvinyl alcohol derived from polyvinyl formate is as follows. With a temperature of polymerization of 30° C., the degree of swelling is 1.48–1.52; with a polymerization temperature of 0° C. the degree of swelling is 1.30–1.34; and at —30° C., the degree of swelling is 0.79–1.01. Thus, at a temperature of polymerization of 30° C., the degree of swelling has substantially the same value as that of polyvinyl alcohol obtained from polyvinyl acetate polymerized at —78° C. Furthermore, it has been found that the degree of swelling of polyvinyl alcohol derived from vinyl formate may be effectively decreased to a value which no polyvinyl alcohol derived from vinyl acetate can attain, by lowering the temperature of polymerization.

The influence of polymerization conditions in the production of polyvinyl formate upon the properties of the resulting polyvinyl alcohol, especially in relation to the degree of conversion is shown in the drawing wherein the temperatures indicated are polymerization temperatures. As will be seen from the drawing, at polymerization temperatures of 0° C. and below, the influence of the degree of conversion is negligible but increases at higher temperatures. However, the influence of the polymerization temperature is greater than that of the degree of conversion.

The qualitative differences among polyvinyl alcohols of different origins described above may similarly be observed when the polyvinyl alcohols are heat-treated. For example films prepared at 30° C. from polyvinyl alcohols made by saponifying polyvinyl formates polymerized at 30° C. and —30° C., show degrees of swelling in pure water of 1.48, and 0.99, respectively. On the other hand, the degrees of swelling of films of polyvinyl alcohols derived from polyvinyl acetates polymerized at 60° C., 0° C. and —78° C., are 2.69, 1.76 and 1.59, respectively. By heat-treating these films at 180° C. for 20 minutes, their degrees of swelling attain substantially the same values, i.e., 0.21–0.29. These heat-treated films, however, show significant differences once again when they are dipped in hot water. In hot water having a temperature of 85° C., films of polyvinyl alcohols made from polyvinyl acetates show degrees of swelling of 1.25, 0.66 and 0.51 respectively, whereas films obtained from polyvinyl formate exhibit relatively low degrees of swelling of 0.60 and 0.29. It is thus apparent that polyvinyl alcohol produced from the polyvinyl formate obtained by polymerizing vinyl formate in accordance with this invention has outstanding water-resisting properties.

When polyvinyl alcohol is dissolved in a mixed solution consisting of water and dimethyl-sulphoxide in the proportion of 40:60, and the resultant solution is allowed to stand at 30° C., the solution becomes increasingly turbid. It is generally believed that the clouding velocity is directly proportional to the degree of swelling in water and to the gelatinizing velocity in a concentrated aqueous solution. Furthermore, it is generally believed that polyvinyl alcohol exhibiting a higher clouding velocity has a more regular molecular structure.

We have found that polyvinyl alcohol obtained from polymerized vinyl formate has a higher clouding velocity than polyvinyl alcohol prepared from polymerized vinyl acetate. The clouding velocity of the polyvinyl alcohol derived from polyvinyl formate is 3–5 times as fast as that of polyvinyl alcohol resulting from polyvinyl acetate when the temperature of polymerization is above 0° C. to 60° C.

Thus, polyvinyl alcohol obtained from polymerized vinyl formate displays valuable distinguishing properties as compared with polyvinyl alcohol produced from polymerized vinyl acetate. These differences become particularly striking when polymerization is carried out at 0° C. and lower temperatures in accordance with this invention.

In the polymerization of vinyl formate, the polymer may tend to become a macro-gel or to separate as a precipitate as the polymerization reaction progresses, owing to the fact that polyvinyl formate is insoluble or difficultly soluble in its monomer and in various organic solvents used in solvent polymerization. In the bulk polymerization of vinyl formate, gelatinization may be observed from the initial stage of polymerization. As a result of the foregoing, it is sometimes difficult to control the rate of polymerization and the degree of polymerization.

We have made the surprising discovery that lower alkyl formates are highly suitable polymerization solvents for the polymerization of vinyl formate, and we thus prefer to carry out the foregoing polymerization of vinyl formate in the presence of a lower alkyl, e.g. 1 to 6 carbon alkyl formate. Lower alkyl formates not only are among the few solvents for polyvinyl formate, but they are also far superior in the polymerization of vinyl formate in comparison with acetone and other known polymerization solvents, especially, polymerization is carried out at a low temperature, e.g. 0° C. and below. The lower alkyl formate prevents the polymerization phase from becoming non-uniform as the result of separation of the polymer, thereby facilitating continuous polymerization. Furthermore, lower alkyl formates, e.g. methyl formate, have solidification points which are very low, and they can be used at temperatures below the solidification point of vinyl formate (—75° C.) as well as at higher temperatures. In addition, when lower alkyl formates, e.g. methyl formate, are used as a polymerization solvent, it is possible to remove unreacted vinyl formate and the lower alkyl formate by azeotropic distillation at low temperature under reduced pressure for the purpose of recovering the polymer from the reaction phase. For example, when polyvinyl alcohol is to be produced by the saponification of the polymer obtained by separating the polymer from the polymerization phase, the unreacted monomer and the lower alkyl formate may easily be removed from the reaction phase by distillation under reduced pressure even after adding dioxane, acetone, or other solvents to the reaction mixture, or after introducing the reaction mixture into methanol or other precipitant.

Furthermore, since the transfer constant for lower ester formates is very small, the polymer may easily be produced by continuous operation even when a large amount of the solvent is used. When a polymer of a lower degree of polymerization is desired, control of the degree of polymerization may readily be accomplished by adding dioxane, acetone or otherlike solvent to the polymerization phase. A further advantage obtainable by the use of a lower alkyl formate such as methyl formate as a polymerization solvent lies in the fact that a polymer of better quality can be produced than is the case when other polymerization solvents are used.

It is thus possible by the use of a lower alkyl formate to carry out the polymerization of vinyl formate smoothly and continuously at low temperature, whereby a polyvinyl alcohol having a high degree of polymerization and excellent crystalline properties can be readily obtained.

The reasons for the highly effective action of lower alkyl formates for the polymerization of vinyl formate is not fully understood. However, the following factors are believed to be pertinent.

(1) The carbonyl stretching vibration of formyl group of the vinyl formate shifts towards lower frequencies in the electron donating media.

(2) Partially formylized polyvinyl alcohol has a lower solubility in water and a lower degree of swelling in comparison with partially acetalized polyvinyl alcohol having the same degree of acetalization. Moreover, Huggins' constant K, of the partially formalized polyvinyl alcohol is large when its viscosity in aqueous solution is measured.

(3) When the thermal variations of 1,2 glycol-bonding of polyvinyl alcohols obtained by saponifying bulk polymers of vinyl formate and vinyl acetate, are examined, the 1,2 glycol bonding originating from vinyl formate shows a much greater difference between normal activating energies of 1,3 addition and 1,2 addition at the time of polymerization, and has a smaller value as compared with that originating from vinyl acetate.

From the foregoing three factors, it is presumed that the formyl groups of vinyl formate have an intense reciprocal action, and polymerization of vinyl formate progresses while the association of molecules is maintained. In the polymerization of vinyl formate in a solution system, accordingly the solvent may be a factor in maintaining the association of molecules. For example, a film of polyvinyl alcohol obtained through the saponification of polyvinyl formate polymerized by the use of a lower alkyl formate, e.g. methyl formate, as the solvent has a lower degree of swelling in water than films of polyvinyl alcohols made from the polymers produced in other solvent systems. At any rate, a distinguishing feature of the use of a lower alkyl formate is that polymerization may be smoothly advanced without disturbing the structural regularity of the polyvinyl alcohol finally produced.

We have also discovered that the previously-mentioned tendency of vinyl formate, particularly when polymerized at low temperature to form macro-gels or to precipitate from the polymerization system, can be effectively suppressed by adding to the polymerization system a small quantity, e.g. up to 25% by weight of the vinyl formate, of vinyl acetate.

Thus polymerization of vinyl formate is effected in accordance with this invention either by solvent polymerization or bulk polymerization techniques. When solvent polymerization is employed, reaction is preferably and most advantageously carried out in a lower alkyl formate in sufficient amount to hold the vinyl formate and polyvinyl formate in solution throughout the reaction. When polymerization of vinyl formate is effected in bulk, the reaction is preferably and most advantageously carried out in the presence of vinyl acetate.

By the use of a small amount of vinyl acetate not only are undesired viscosity increases, gelling, separation of polymer, and the like effectively checked, so that the polymerization reaction proceeds smoothly, but we have found that the resulting co-polymerization does in no way adversely affect the crystalline qualities of the polyvinyl alcohol derived by the saponification of the copolymer, and the degree of polymerization of the polyvinyl alcohol is not altered by such copolymerization. The crystallinity of polyvinyl alcohol is judged from the degree of swelling in water of the film formed with polyvinyl alcohol when tested at room temperature. No appreciable variation was observable in the degree of swelling in water of the products, wherein vinyl acetate was incorporated in an amount up to 25%. However, when vinyl acetate was used in amounts over 25%, the degree of swelling gradually increased, approaching the value for the polyvinyl alcohol derived solely from polyvinyl acetate.

It will be understood that the use of added vinyl acetate and the use of lower alkyl formate solvents may be combined in carrying out the process of this invention. Thus, solvent polymerization of vinyl formate in admixture with up to 25% by weight of vinyl acetate may be carried out in solution in a lower alkyl formate, e.g. methyl formate, in an amount sufficient to maintain the monomers and the resultant co-polymers in solution.

It will also be understood that, unless otherwise indicated, conventional vinyl ester polymerization techniques cataylsts and polymerization apparatus are employed in forming vinyl formate polymers and co-polymers in accordance with the present invention. Suitable polymerization catalysts, vessels and techniqus are described for example in Cline et al., U.S. Patent 2,610,360. Conventional techniques and operations are employed in the conversion of the vinyl formate polymers and co-polymers into polyvinyl alcohol. Polyvinyl alcohol is a polymer containing hydroxyl groups and corresponding to the formula:

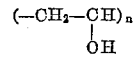

wherein $n$ is an integer which can vary within wide limits, as is well-known in the art. Polyvinyl alcohol can be produced from the corresponding polyvinyl ester, e.g. polyvinyl formate, or co-polymer ester, by alkaline or acid saponification or re-esterification, i.e. alcoholysis, in accordance with the following equation:

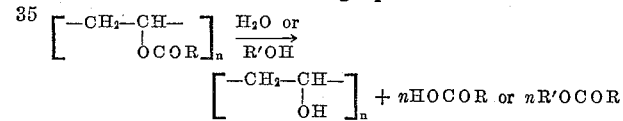

The foregoing reactions are referred to generally by the term "saponification" in accordance with conventional practice.

With respect to known saponification processes and techniques, reference is suitably made, for example, to Bristol U.S. Patent 2,700,035, Waugh et al. U.S. Patent 2,642,419 and Germain U.S. Patent 2,643,994. Of particular suitability are the process techniques and apparatus described in the copending application of Tsuguo Kominami, Serial No. 862,626, filed December 29, 1959.

In like manner the polyvinyl alcohol is formed into fibers, films, and other shaped forms by following conventional practice. The spinning of polyvinyl alcohol to form fibers, particularly the so-called "wet-spinning" technique is described, for example, in the above-mentioned Cline et al. U.S. Patent 2,610,360 and in Osugi et al. Patent No. 2,906,594. An espcially preferred spinning technique is described in copending application Serial No. 336,166 of Tomonari et al., filed February 10, 1953.

In any case, conventional dry-spinning or wet-spinning operations are employed in producing the fibers and subsequent heat-treatment, stretching and relaxation are effected using known techniques as described, for example, in said patents.

Similarly, films and other shaped forms of polyvinyl alcohol are suitably produced in conventional manner as described, for example, in Schnabel U.S. Patent 2,177,-612 and in U.S. Patents 2,236,061 and 2,837,770.

The fibers, films, or other shaped objects producible from the polyvinyl alcohol may be acetalized to decrease their water solubility in accordance with conventional practice in this art as described, for example, in the above-mentioned Osugi et al. Patent 2,906,594 and in Cline et al. Patents 2,636,803 and 2,749,208.

The polyvinly alcohol obtained by the conventional saponification of polyvinyl formates produced in accordance with this invention is characterized by crystallinity as determined by conventional X-ray diffraction techniques applied, for example, to films or fibers of the polyvinyl alcohol, and by a degree of swelling in water of less than 1.5, as measured upon a film of the polyvinyl alcohol of, for example, a thickness of 0.2 mm. The degree of swelling in water is measured by standard tests designed to determine this property, at specified temperatures, e.g. at 30° C. and at 85° C., the film being immersed in water at the specified temperature for a prdetermined period of time, e.g. 5 minutes. Tests to determine the degree of swelling in water of polyvinyl alcohol by film immersion in water are well known in the art relating to polyvinyl alcohol. The "degree of swelling" is also known as the "swelling index" to those skilled in the art; the degree of swelling values are obtaind from these film immersion tests and are expressed in terms of "the weight of water imbibed per unit weight of polymer." Representativ descriptions and discussions of these tests relating to polyvinyl alcohol film immersion in water to determine the degree of swelling value are contained in the following articles: "Swelling of Polyvinyl Alcohol in Water," W. J. Priest, Journal of Polymer Science, volume 6, No. 6, pages 699–710 (1951); "Stereoregulated Polymerization in the Free Propagating Species," J. W. L. Fordham, G. H. McCain, L. E. Alexander, Journal of Polymer Science, volume 39, pages 335–345 (1959).

While polymerization is preferably carried out in accordance with this invention in an inert atmosphere, e.g. in an atmosphere of nitrogen, polymerization may also be effected in the presence of oxygen, e.g. in the presence of air.

The invention will be further understood from the following specific examples of practical application. However, it will be understood that these examples are not to be construed as limiting the scope of the present invention in any manner. In the examples, all parts are by weight unless otherwise indicated. The conditions and the relative relationships set forth in the examples are thus preferred in carrying out the process of the invention but it will be understood that other conditions and relationships may be used within the scope of the invention.

*Example 1*

A polymerization solution consisting of 99 parts of vinyl formate, 1 part of acetaldehyde, 0.66 part of benzoyl peroxide, and 0.275 part of triethyl-boron was sealed in a test tube, and the air contained in the tube was replaced with nitrogen. Polymerization was carried out by allowing the tube to remain at −30° C. for 19 hours.

After this period of polymerization, the catalysts were rendered inactive and the polymerzation stopped by the addition of small quantities of hydroquinone and meta-dinitrobenzene. The polymer, which represented a 17.5% polymerization percentage or conversion, was then precipitated from the polymerization mass by means of petroleum ether. The separated polymer was purified by being repeatedly dissolved in acetone and reprecipitated with petroleum ether, and the purified polymer was dried under reduced pressure. This polymer was dissolved in dioxane and the resulting solution was saponified by adding a 1 N aqueous solution of caustic soda containing hyrous dioxane. A polyvinyl alcohol having a degree of polymerization (PA) of 1065 was thus obtained. A film (0.2 mm. thickness) prepared from this solution of polyvinyl alcohol at 30° C., exhibited a degree of swelling of 0.90 in water at 30° C. In contrast with this value, the degree of swelling of polyvinyl alcohol obtained by the polymerization of vinyl acetate at −78° C. was 1.59.

After the film was heat-treated at 180° C. for a period of 20 minutes, the degree of swelling in pure water at 85° C. for the film derived from vinyl formate was 0.29. In contrast, the degree of swelling of the polyvinyl alcohol formed from polyvinyl acetate was 0.51.

Furthermore, when the film which was heat-treated at 180° C. for a period of 20 minutes was examined by infrared ray absorptive spectra, the so-called crystalline absorption band of $8.74\mu$ was observed. The ratio of the degrees of absorption of the rays for absorptions of $8.74\mu$ and $9.1\mu$ was D8.74/D9.1–0.86. When this ratio is compared with the value of D8.75/D9.1–0.73 for the heat-treated film of polyvinyl alcohol obtained by saponifying polyvinyl acetate prepared by polymerization in 20% methanol solution at a temperature of 60° C., a substantial difference is seen.

*Example 2*

Films were prepared at room temperature (about 20° C.) from polyvinyl alcohol obtained from the polymer produced by the polymerization of vinyl formate at 0° C. and polyvinyl alcohol obtained from the polymer made by the polymerization of vinyl acetate in 20% methanol solution at 60° C. Both films were formalized and their degrees of swelling in hot water at 85° C. were determined. With a degree of formalization of 25 mol percent, the degree of swelling for a film derived from polymerized vinyl formate was 2.3 and that derived from polymerized vinyl acetate was 4.8. With a degree of formalization of 32 mol percent, the degree of swelling of the former film was 1.0 and the degree of swelling of the latter film was 1.6. The differences in the water-resisting properties shown in the case of the products described in Example 1 were also observed in the formalized polyvinyl alcohols described above.

*Example 3*

Under an atmosphere of nitrogen, polymerization of the following solution was effected in a closed test tube under the conditions indicated:

| | |
|---|---|
| Vinyl formate | 100 parts. |
| Triethyl-boron | 0.196 part. |
| Benzoyl peroxide | 0.484 part. |
| Temperature and time of polymerization | At 0° C. for 18 hours. |
| Percentage of polymerization | 22.4%. |
| PA (degree of polymerization of polyvinyl alcohol) | 2120. |

The polyvinyl alcohol obtained from the polymer produced in the above polymerization was dissolved in a mixture of water and dimethyl-sulphoxide in the volume ratio of 40:60 to provide a concentration of 3 g./l. with respect to polyvinyl alcohol. The solution was allowed to stand at 30° C. to measure its clouding velocity.

The clouding velocity is expressed by the formula $t\frac{1}{2} \cdot PA^{0.6}$ (hr.), wherein $t\frac{1}{2}$ is the time in hours required for the degree of clouding to attain a value approximating ½ of the degree of clouding in equilibrium, and PA is the degree of polymerization of the polyvinyl alcohol. As a result of the above measurement, the value of $0.3 \times 10^3$ hrs. was obtained. In the case of polyvinyl alcohols prepared by the polymerization of vinyl acetate, the clouding velocity value for the polymer polymerized at 0° C. was $2.97 \times 10^3$ hrs. and for the polymer polymerized at −20° C. the value was $1.7 \times 10^3$ hrs. As will be seen from these figures, the clouding velocity for polyvinyl alcohol derived from vinyl formate is much faster.

*Example 4*

Polymerization of the following solution was effected under the conditions indicated in the presence of oxygen, i.e. without providing an inert atmosphere as in Examples 1–3.

| | |
|---|---|
| Vinyl formate | 100 parts. |
| Methanol | 100 parts. |
| Acetaldehyde | 0.2 parts. |
| Triethyl-boron | 0.275 part. |
| Temperature and time of polymerization | 0° C. for 24 hours. |
| Conversion or percent polymerization | 44.2%. |

The polymer thus obtained was crystalline and yielded crystalline polyvinyl alcohol upon saponification.

Example 5

A polymerization mixture consisting of

| | Parts |
|---|---|
| Vinyl formate | 30 |
| Methyl formate | 70 |
| Triethyl-boron | 0.0825 | was polmerized at −40° C. To initiate polymerization the triethyl-boron was added to the mixture of vinyl formate and methyl formate contained in a tube under an atmosphere of nitrogen. The tube was closed after blowing dried air into the mixed phase. The mixed phase was subjected to polymerization by allowing the tube to stand for 20 hours at a temperature of −40° C. Polymerization proceeded smoothly. To recover the polymer, the polymer was precipitated by the addition of methanol after polymerization had been stopped by adding an acetone solution of meta-dinitrobenzene.

The polymer obtained represented a conversion of 6% and the degree of polymerization (PA) of the polyvinyl alcohol produced by conventional saponification of the polyvinyl formate was 910.

Example 6

The polymerization mixture described in Example 5 was polymerized at 0° C. for a period of 20 hours. To stop polymerization, a dioxane solution of meta-dinitrobenzene was added to the reaction phase with cooling to render the catalyst inert. Subsequently, the unreacted monomer and methyl formate remaining in the reaction phase were recovered by distillation under a pressure of 10–30 mm. Hg at 0° C. The dioxane solution of polyvinyl formate thus recovered was further distilled at room temperature at lower pressure so that the remaining monomer and methyl formate were completely driven out. The recovered polyvinyl formate was then saponified by adding a 1 N solution of caustic soda containing hydrous dioxane, and polyvinyl alcohol was readily produced. Based on the yield of polyvinyl alcohol, the percent polymerization was about 21%, and the PA=850. Furthermore, since unreacted monomer together with methyl formate can be readily removed under a reduced pressure, as demonstrated in this example, pure polyvinyl formate can easily be obtained in the form of a solution or as a precipitate by driving out the monomer and the solvent by distillation under atmospheric pressure or at reduced pressure. For this purpose, various solvents other than dioxane may be added to the polymerization mixture following polymerization, e.g. alcohols such as methanol, and like lower alkyl alcohols, ketones such as acetone, and like aliphatic ketones, halogenated hydrocarbons, and aliphatic ethers.

Example 7

In the presence of oxygen, polymerization of the following solution was effected under the conditions indicated:

| | |
|---|---|
| Vinyl formate | 100 parts. |
| Methyl formate | 100 parts. |
| Acetaldehyde | 0.2 part. |
| Triethyl-boron | 0.275. |
| Temperature and time of polymerization | −78° C. for 48 hours. |
| Conversion or percentage polymerization | 16%. |
| Degree of polymerization of polyvinyl alcohol | 1,285. |

Generally, polyvinyl formate obtained at a polymerization temperature of over 30° C. is soluble in acetonitrile and methyl formate at room temperature. On the contrary, the polymer produced in the foregoing example was insoluble in both solvents at room temperature. A film of this polymer provided a crystalline X-ray diffraction pattern. Its drawn sample gave a clear X-ray diffraction pattern of fiber. The wave-length of the fiber was 5 A. The film formed at the room temperature from the polyvinyl alcohol obtained by saponifying the vinyl formate polymer of this example had a low degree of swelling in water of 0.8. The amount of 1,2 glycol bonds was also low, viz. a value of 0.16 mol percent.

Example 8

Polymerization was effected in the presence of nitrogen at 0° C. for 17 hours upon mixtures of 100 parts of vinylformate monomer, containing 2%, 5%, and 10% of vinylacetate, to which was added 0.275 part of triethyl-boron and 0.656 parts of benzoyl peroxide. Percentage polymerization in the three samples were 44.2, 35.7, and 34.9%, respectively. The fluidity of the system was markedly improved in each case by the presence of the small amount of vinyl acetate. The polymerization proceeded without loss fluidity and there was no separation of polymers during polymeriaztion. The polymer was recovered and converted to polyvinyl alcohol as described in Example 1. The degrees of swelling in water of 30° C. of films of the polyvinyl alcohol thus produced were 1.09, 1.15, and 1.13 respectively, which values are substantially equal to the degree of swelling of 0.94 of polyvinyl alcohol derived from polymers initially obtainable after the addition of vinyl acetate. However, if polymerization is continued without additional vinyl acetate until a percent polymerization of 68.5% is reached, the degree of swelling of films of polyvinyl alcohol derived from the products of polymerization is increased to 2.21 because of the occurrence of gelation. Thus, additional amounts of vinyl acetate are advantageously used if high polymerization percentages are desired.

While the use of a lower alkyl formate, e.g. methyl formate, or the use of a small percentage of vinyl acetate, in admixture with the vinyl formate being polymerized to prevent undesired viscosity increases, precipitation or gelation, is of particular utility in preparing the crystalline products by polymerization of vinyl formate at 0° C. and below in accordance with this invention, it will be understood that the use of lower alkyl formates or vinyl acetate may be applied in the polymerization of vinyl formate at higher temperatures, e.g. temperatures up to 60° C. The following examples are illustrative of such operation.

Example 9

A polymerization solution having the following composition was sealed in a test tube.

| | Parts |
|---|---|
| Vinyl formate (B.P. 46–46.5) | 70 |
| Methyl formate | 30 |
| 2,2′ azo-bis-isobutyronitrile | 0.2 |

After replacing the air contained in the tube with nitrogen, polymerization was carried out by allowing the tube to stand at a temperature of 30° C. for 10 hours.

Polymerization was terminated by the addition of an acetone solution of hydro-quinone. The polymer, which represented a percentage polymerization of 27.3%, was separated by the use of methanol as a precipitant. An acetone solution of this polyvinyl formate was added to a 1 N solution of caustic soda containing hydrous methanol and the polyvinyl formate was saponified at room temperature. The resultant polyvinyl alcohol had a degree of polymerization of 2110.

Example 10

Following the general procedure of Example 9, the following mixture,

| | Parts |
|---|---|
| Vinyl formate | 70 |
| Methyl formate | 30 |
| 2,2′ azo-bis-isobutyronitrile | 0.01 | was polymerized for 24 hours at 60° C. to provide a percent of polymerization of 86.4%.

After completion of polymerization, the polymer was separated. Because of the presence of methyl formate, the tendency to gel during polymerization was satisfactorily controlled.

*Example 11*

To a series of samples each containing 0.1 part of 2,2-azo-bis-isobutyronitrile and 100 parts of vinyl formate, vinyl acetate was added in the proportion of 0%, 1%, 2%, 3%, and 5% based on the weight of the vinyl formate, the sample with no vinyl acetate added to it being used as a control. Polymerization was carried out in the presence of nitrogen at 30° C. for 24 hours. The sample containing no vinyl acetate gelled. With increasing content of vinyl acetate, the increase in viscosity became less. The samples containing more than 3% vinyl acetate maintained their fluidity even after a lapse of 24 hours. The polymerization yields were 68.1%, 62.8%, 63.2%, 58.5%, and 52.7% respectively, indicating a somewhat slowing effect of vinyl acetate on the velocity of polymerization.

The degrees of swelling of polyvinyl alcohol derived from the products described above were 1.48, 1.30, 1.36, 1.34, and 1.31, respectively. The degrees of polymerization of the polyvinyl alcohol also showed negligible differences, viz. 910, 899, 908, and 901, respectively.

We claim:

1. Crystalline polyvinyl formate exhibiting a clear ring X-ray diffraction pattern in the unstretched condition;
   said polyvinyl formate exhibiting a clear X-ray diffraction pattern of fiber when drawn and said drawn fiber wave length being 5 A.;
   said polyvinyl formate convertible by saponification to polyvinyl alcohol having a small content of 1,2 glycol bonds;
   and where said polyvinyl formate is produced by the process which comprises preparing a polymerization system comprising a free radical polymerization catalyst and vinyl formate monomer,
   maintaining the polymerization system at a temperature within the range of above the solidification point of the polymerization system to at most 0° C. during the polymerization of said vinyl formate monomer,
   and recovering crystalline polyvinyl formate produced by said polymerization of said vinyl formate monomer.

2. Crystalline polyvinyl alcohol having a small content of 1,2 glycol bonds and a low degree of swelling in water;
   said polyvinyl alcohol being produced by the saponification of polyvinyl formate polymer;
   said polyvinyl formate polymer being obtained by the polymerization of a material selected from the group consisting of vinyl formate monomer and a monomer mixture of vinyl formate containing from 1% to 25 mol percent of vinyl acetate,
   said polymerization being conducted at a temperature within the range of above the solidification point of the polymerization system to at most 0° C.,
   and where the polymerization system consists of a free radical polymerization catalyst, and compounds selected from the group consisting of said materials and said materials contained in a polymerization solvent; said polymerization solvent being sufficient to maintain said materials in solution during said polymerization and being a lower alkyl formate selected from the group consisting of 1 to 6 carbon alkyl formates.

3. A process of preparing crystalline polyvinyl formate exhibiting a clear ring X-ray diffraction pattern in the unstretched condition and convertible to polyvinyl alcohol having a low degree of swelling in water which comprises,
   preparing a polymerization system comprising a free radical polymerization catalyst and vinyl formate monomer,
   maintaining the polymerization system at a temperature within the range of above the solidification point of the polymerization system to at most 0° C. during the polymerization of said vinyl formate monomer,
   and recovering said crystalline polyvinyl formate produced by said polymerization of said vinyl formate monomer.

4. A process of preparing crystalline polyvinyl formate exhibiting a clear ring X-ray diffraction pattern in the unstretched condition and convertible to polyvinyl alcohol having a low degree of swelling in water which comprises,
   preparing a polymerization system comprising a polymerization catalyst and vinyl formate monomer and where said polymerization catalyst is triethyl-boron,
   maintaining the polymerization system at a temperature within the range of above the solidification point of the polymerization system to at most 0° C. during the polymerization of said vinyl formate monomer,
   and recovering said crystalline polyvinyl formate produced by said polymerization of said vinyl formate monomer.

5. A process of preparing polyvinyl formate by the polymerization of vinyl formate monomer which comprises preparing a polymerization system comprising vinyl formate monomer, a free radical polymerization catalyst, and a lower alkyl formate polymerization solvent selected from the group consisting of 1 to 6 carbon alkyl formates;
   maintaining the polymerization system at a temperature within the range of above the solidification point of the polymerization system to 60° C. during the polymerization of said vinyl formate monomer,
   and recovering polyvinyl formate produced by said polymerization of said vinyl formate monomer.

6. A process according to claim 5 wherein said temperature is maintained within the range of above the solidification point of the polymerization system to at most 0° C. during said polymerization.

7. A process according to claim 5 wherein said lower alkyl formate is methyl formate.

8. A process according to claim 6 wherein said prepared polymerization system contains in addition from about 1 mol percent to about 25 mol percent of vinyl acetate monomer.

9. A process of polymerizing vinyl formate monomer in a polymerization system which comprises polymerizing vinyl formate monomer in the presence of about 1 mol percent to about 25 mol percent of vinyl acetate monomer at a temperature within the range of above the solidification point of the polymerization system to at most 0° C. and in the presence of a free radical polymerization catalyst.

10. A process of preparing crystalline polyvinyl alcohol having a small content of 1,2 glycol bonds and a low degree of swelling in water which comprises,
    saponifying polyvinyl formate polymer,
    said polyvinyl formate polymer being obtained by the polymerization of a material selected from the group consisting of vinyl formate monomer and a monomer mixture of vinyl formate containing from 1 mol percent to 25 mol percent of vinyl acetate,
    said polymerization being conducted at a temperature within the range of above the solidification point of the polymerization system to at most 0° C.,
    and where the polymerization system consists of a free radical polymerization catalyst, and compounds selected from the group consisting of said materials and said materials contained in a polymerization solvent; said polymerization solvent being sufficient to maintain said materials in solution during said polymerization and being a lower alkyl formate selected from the group consisting of 1 to 6 carbon alkyl formates.

11. A process of preparing crystalline polyvinyl alcohol having a small content of 1,2 glycol bonds and a low degree of swelling in water which comprises,
saponifying polyvinyl formate polymer,
said polyvinyl formate polymer being obtained by the polymerization of a material selected from the group consisting of vinyl formate monomer and a monomer mixture of vinyl formate containing from 1 mol percent to 25 mol percent of vinyl acetate,
said polymerization being conducted at a temperature within the range of above the solidification point of the polymerization system to at most 0° C.,
and where the polymerization system consists of a triethyl-boron polymerization catalyst, and compounds selected from the group consisting of said materials and said materials contained in a polymerization solvent; said polymerization solvent being sufficient to maintain said materials in solution during said polymerization and being a lower alkyl formate selected from the group consisting of 1 to 6 carbon alkyl formates.

References Cited in the file of this patent

UNITED STATES PATENTS

| | | |
|---|---|---|
| 2,160,372 | Stark | May 30, 1939 |
| 2,610,359 | Hatchard et al. | Sept. 16, 1952 |
| 2,610,360 | Cline et al. | Sept. 16, 1952 |
| 3,035,032 | Collinson et al. | May 15, 1962 |

FOREIGN PATENTS

| | | |
|---|---|---|
| 819,291 | Great Britain | Sept. 2, 1959 |

OTHER REFERENCES

Huggins: Journal of American Chemical Society, 66, 1991 (1944).

Natta: Scientific American, volume 197, No. 3, September 1957.

Hans et al.: Journal of Polymer Science, volume 22, pages 295–300, 1956.

Dittmar et al.: Journal of Polymer Science, volume 18, pages 275–298, 1955.

Miller et al.: Journal of Polymer Science, volume 44, pages 391–395, June 1960.

Bunn: Advances in Colloid Science, volume II, pages 121–124, Interscience, New York, 1946.

Bunn: Journal of Applied Physics, volume 25, page 821, 1954.